United States Patent
Rush (10) Patent No.: US 10,412,315 B1
(45) Date of Patent: Sep. 10, 2019

(54) JACKET CAMERA

(71) Applicant: Timothy Rush, Norwich (GB)

(72) Inventor: Timothy Rush, Norwich (GB)

( * ) Notice: Subject to any disclaimer, the term of this patent is extended or adjusted under 35 U.S.C. 154(b) by 33 days.

(21) Appl. No.: 15/865,417

(22) Filed: Jan. 9, 2018

(51) Int. Cl.
| H04N 5/247 | (2006.01) |
| H04N 5/225 | (2006.01) |
| A41D 1/02 | (2006.01) |
| A41D 1/00 | (2018.01) |
| H04N 5/232 | (2006.01) |

(52) U.S. Cl.
CPC ............ *H04N 5/247* (2013.01); *A41D 1/002* (2013.01); *A41D 1/02* (2013.01); *H04N 5/2253* (2013.01); *H04N 5/23203* (2013.01)

(58) Field of Classification Search
None
See application file for complete search history.

(56) References Cited

U.S. PATENT DOCUMENTS

| 5,886,739 | A | * | 3/1999 | Winningstad .......... H04N 7/185 348/115 |
| 6,028,627 | A | | 2/2000 | Helmsderfer |
| 9,019,431 | B2 | | 4/2015 | Phillips |
| 9,071,675 | B2 | | 6/2015 | Willenborg |
| D737,878 | S | | 9/2015 | Zhang |
| 9,244,337 | B2 | | 1/2016 | Weihe |
| 9,661,283 | B2 | | 5/2017 | Yokomitsu |
| 10,054,845 | B1 | * | 8/2018 | Garcia .................. G03B 17/561 |
| 2003/0133008 | A1 | * | 7/2003 | Stephenson .......... H04N 5/2251 348/47 |
| 2004/0158910 | A1 | * | 8/2004 | Bay .......................... A41D 3/00 2/69 |
| 2008/0030580 | A1 | | 2/2008 | Kashiwa |
| 2012/0174298 | A1 | * | 7/2012 | Bay .................... A41D 13/0153 2/459 |
| 2017/0105510 | A1 | * | 4/2017 | Tran .......................... A45F 5/02 |
| 2017/0195563 | A1 | * | 7/2017 | Ribeiro ............. H04N 5/23238 |
| 2018/0072226 | A1 | * | 3/2018 | Bunch ....................... B60R 1/00 |

FOREIGN PATENT DOCUMENTS

WO   2017040724 A   3/2017

* cited by examiner

*Primary Examiner* — James M Hannett (57) ABSTRACT

The jacket camera comprises a jacket, left and right shoulder armors, and at least one camera. The left and right shoulder armors each comprise a slide-mount bracket into which the at last one camera may be mounted. The at least one camera comprises a first imaging device and a second imaging device and may therefore record video in a forward-looking direction and a rearward-looking direction simultaneously. The at least one camera comprise a camera housing, a battery, and a controller. The controller comprises a microprocessor, memory, and one or more communication circuits. The one or more communication circuits may allow the at least one camera to communicate with external devices either wirelessly or via a wired connection. The jacket camera comprises a smartphone application that allows a user to view recorded video and to control the operation of the at least one camera wirelessly.

17 Claims, 5 Drawing Sheets

JACKET CAMERA

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicular recording, more specifically, a jacket camera.

SUMMARY OF INVENTION

The jacket camera comprises a jacket, left and right shoulder armours, and at least one camera. The left and right shoulder armours each comprise a slide-mount bracket into which the at last one camera may be mounted. The at least one camera comprises a first imaging device and a second imaging device and may therefore record video in a forward-looking direction and a rearward-looking direction simultaneously. The at least one camera comprise a camera housing, a battery, and a controller. The controller comprises a microprocessor, memory, and one or more communication circuits. The one or more communication circuits may allow the at least one camera to communicate with external devices either wirelessly or via a wired connection. The jacket camera comprises a smartphone application that allows a user to view recorded video and to control the operation of the at least one camera wirelessly.

An object of the invention is to provide a jacket with shoulder armour and brackets to mount at least one camera.

Another object of the invention is to provide a camera that records video in a forward-looking and rear-ward looking direction simultaneously.

A further object of the invention is to provide the camera with the ability to communicate, over wire and wirelessly, with external devices.

Yet another object of the invention is to provide a smartphone application capable of interacting with the camera.

These together with additional objects, features and advantages of the jacket camera will be readily apparent to those of ordinary skill in the art upon reading the following detailed description of the presently preferred, but nonetheless illustrative, embodiments when taken in conjunction with the accompanying drawings.

In this respect, before explaining the current embodiments of the jacket camera in detail, it is to be understood that the jacket camera is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the jacket camera.

It is therefore important that the claims be regarded as including such equivalent construction insofar as they do not depart from the spirit and scope of the jacket camera. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
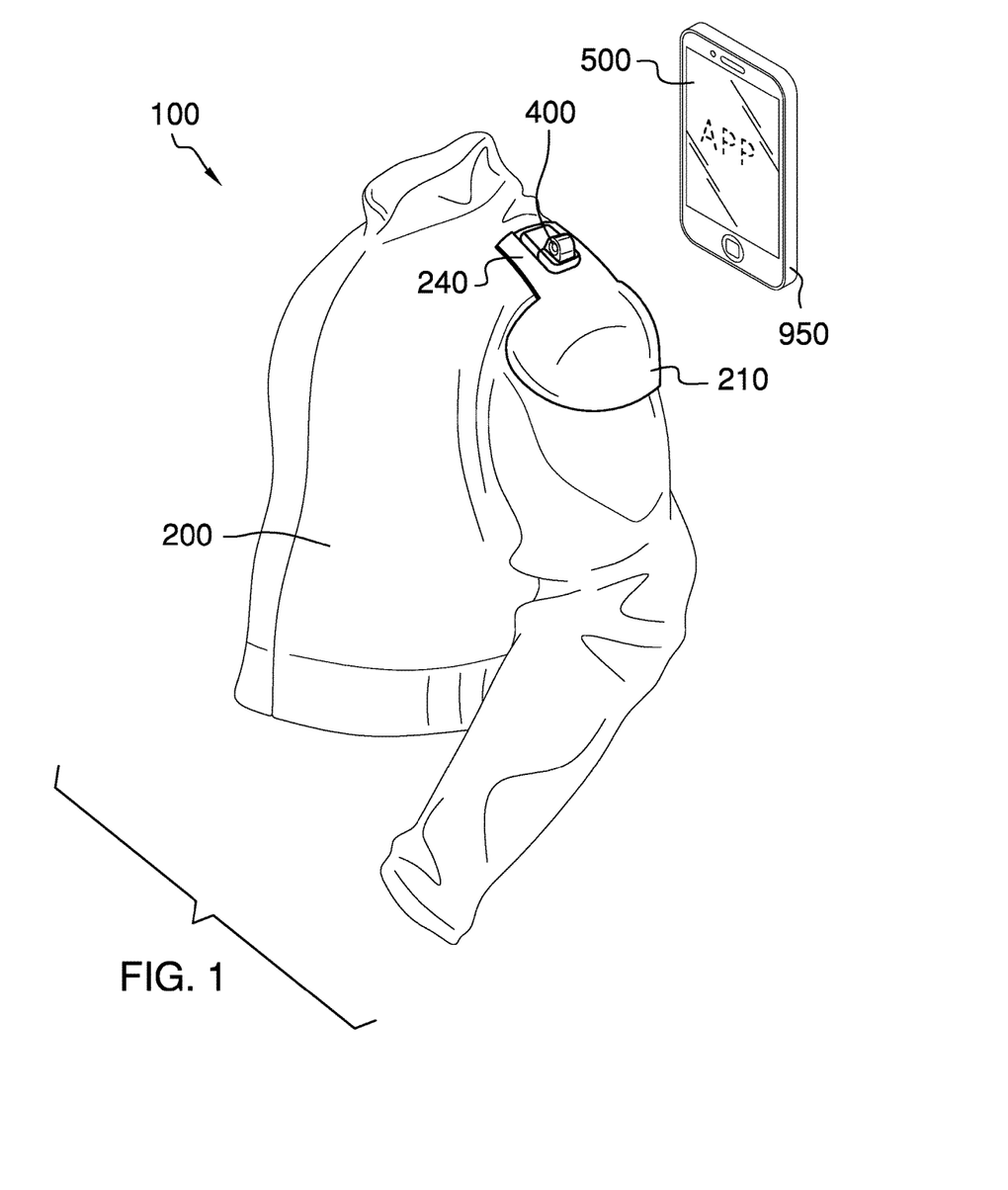
FIG. 1 is a perspective view of an embodiment of the disclosure.
Figure 2:
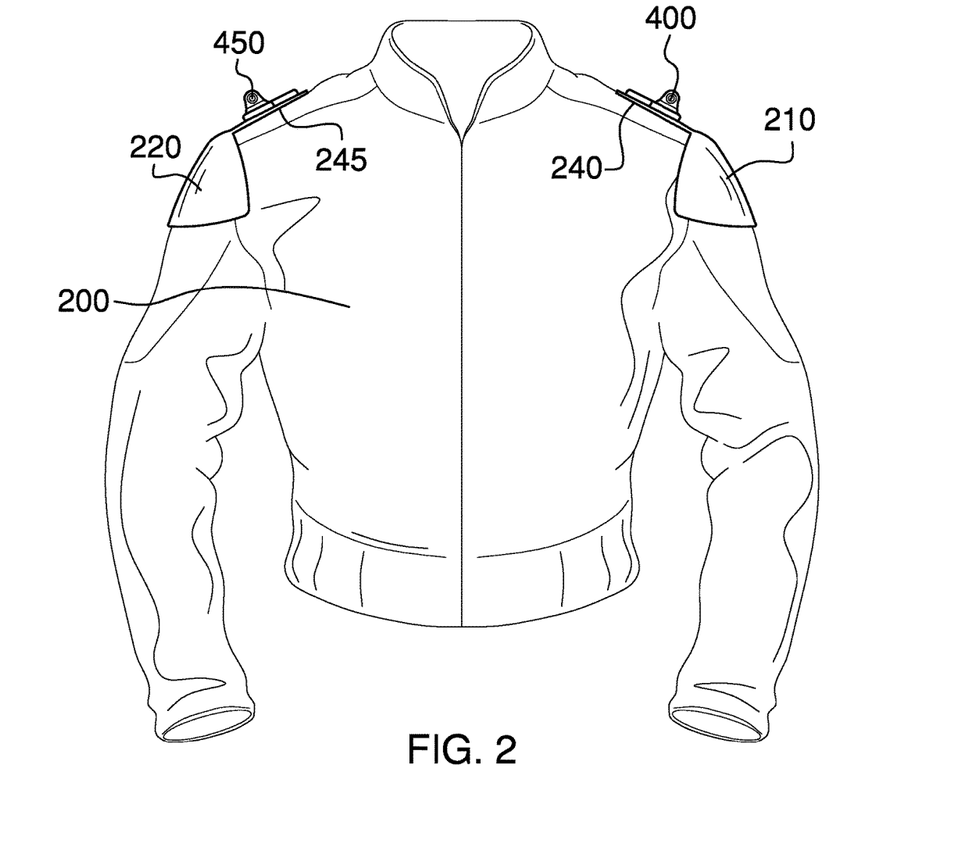
FIG. 2 is a front view of an embodiment of the disclosure.
Figure 3:
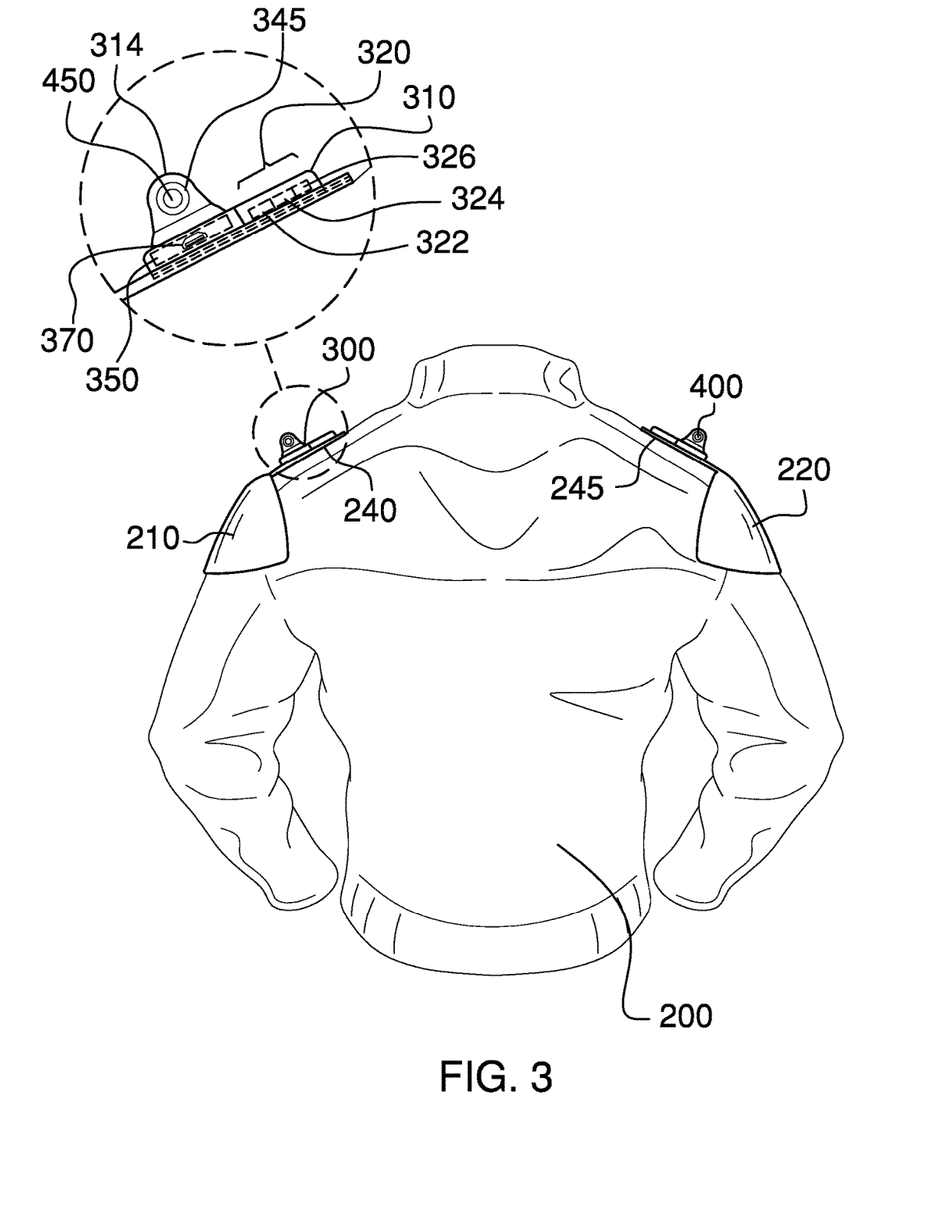
FIG. 3 is a rear view of an embodiment of the disclosure.
Figure 4:
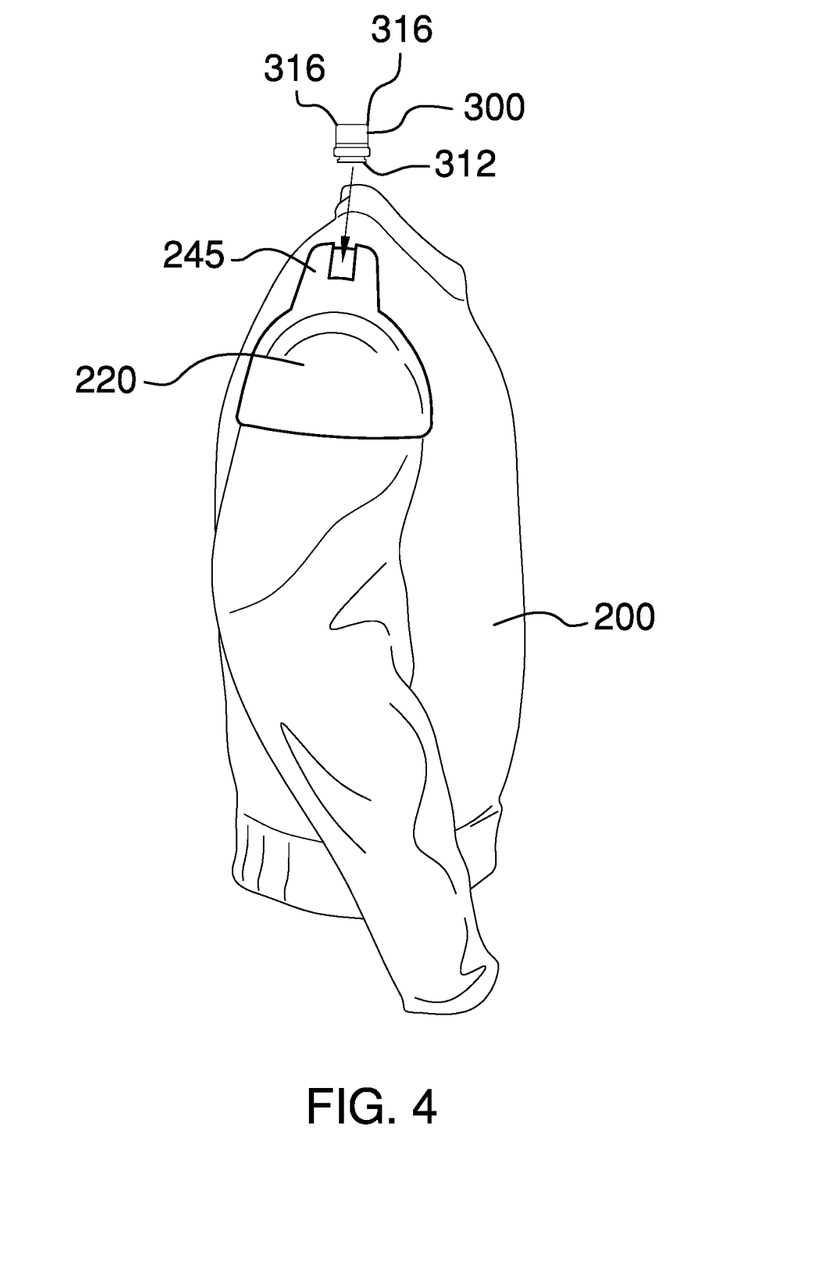
FIG. 4 is a side view of an embodiment of the disclosure.
Figure 5:
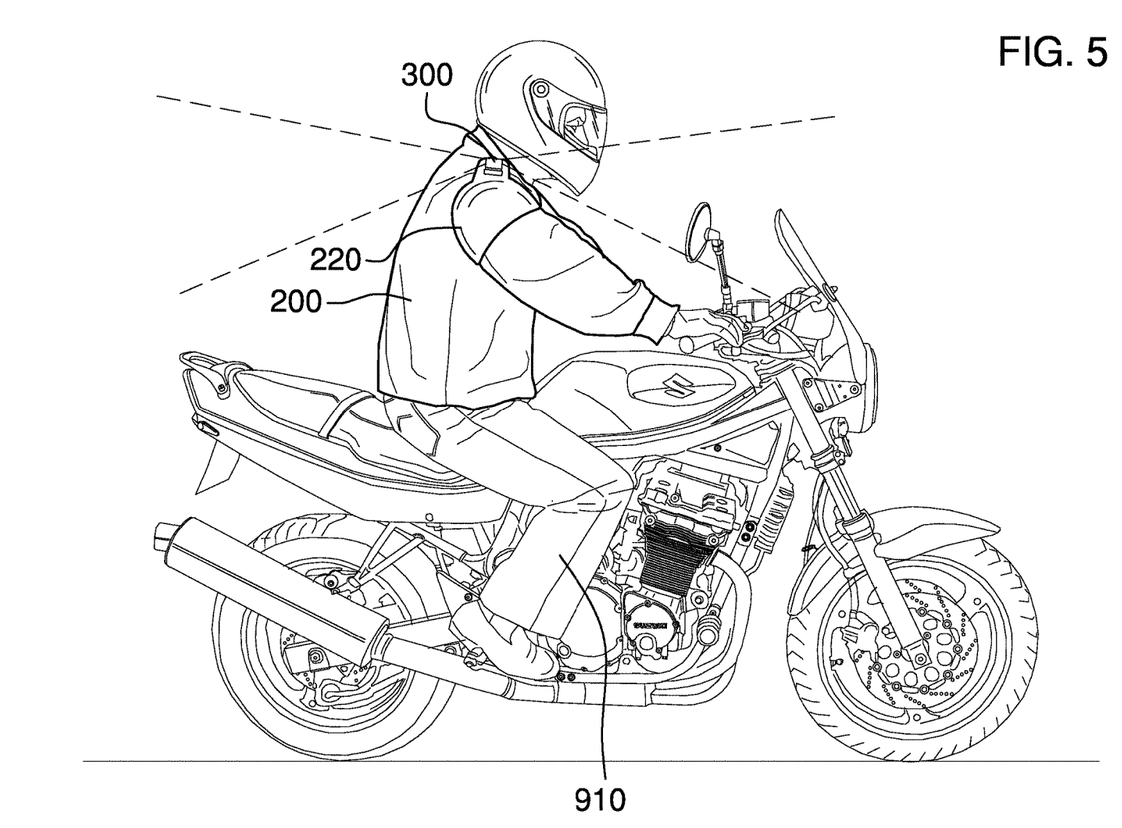
FIG. 5 is an in-use view of an embodiment of the disclosure.

Detailed reference will now be made to a first potential embodiment of the disclosure, which is illustrated in FIGS. 1 through 5.

The jacket camera 100 (hereinafter invention) comprises a jacket 200, at least one camera 300, a left shoulder armour 210, and a right shoulder armour 220. The invention 100 provides a forward-looking camera and a rear-looking camera mounted on the left shoulder armour 210, on the right shoulder armour 220, or on both.

The jacket 200 may be a hip-length, contour-fitting jacket worn by a sporting enthusiast 910 to provide protection from the weather and from injuries. As a non-limiting example, the sporting enthusiast 910 may be a motorcyclist. In some embodiments, the jacket 200 may be fabricated from leather and may comprise a zippered front for donning and removing. In some embodiments, the jacket 200 may further comprise zippered sleeves and zippered pockets.

The at least one camera 300 comprises a camera housing 310, a controller 320, a first imaging device 400, a second imaging device 450, and a battery 350. The at least one camera 300 may be mounted onto a left camera bracket 240 or onto a right camera bracket 245. In addition, two of the at least one cameras 300 may be mounted onto both the left camera bracket 240 and the right camera bracket 245 simultaneously. The at least one camera 300 may record video using the first imaging device 400 and the second imaging device 450 at the same time. If the at least one camera 300 is mounted onto the left camera bracket 240 then the first imaging device 400 may act as the forward-looking camera, recording video in front of the sporting enthusiast 910, and the second imaging device 450 may act as the rear-looking camera, recording video behind the sporting enthusiast 910. If the at least one camera 300 is mounted onto the right camera bracket 245 then the first imaging device 400 may act as the rear-looking camera, recording video behind the sporting enthusiast 910, and the second imaging device 450 may act as the forward-looking camera, recording video in front of the sporting enthusiast 910.

The camera housing 310 may be an enclosure for the first imaging device 400, the second imaging device 450, the controller 320, and the battery 350. The camera housing 310 may comprise a mounting tab 312 on the bottom side of the camera housing 310 for attachment to the left camera bracket 240 or to the right camera bracket 245. The camera housing 310 may have a rectangular footprint when viewed from above. The top of the camera housing 310 may be flat except for a hump 314 extending vertically upwards where the first imaging device 400 and the second imaging device 450 are located. The hump 314 may be oriented to provide an unobstructed view in forward and rearward directions for the first imaging device 400 and the second imaging device 450 which are mounted inside of the camera housing 310 on flat side walls 316 of the hump 314. In some embodiments, the camera housing 310 may provide a first pivoting mount (not illustrated in the figures) and/or a second pivoting mount 345 to allow pivoting in one or more directions of the first imaging device 400 and/or the second imaging device 450, respectively. The first pivoting mount and the second pivoting mount 345 may allow the viewing angle of the first imaging device 400 and the second imaging device 450 to be altered in a vertical plane, a horizontal plane, or both.

The controller 320 comprises a microprocessor 322, memory 324, and one or more communication circuits 326. The controller 320 may be electrically coupled to the first imaging device 400 and to the second imaging device 450. The controller 320 may capture video from the first imaging device 400 and the second imaging device 450 and store the video in the memory 324. The controller 320 may communicate with one or more external devices. As a non-limiting example, the one or more external devices may comprise a smartphone 950, a laptop computer, a tablet computer, or a desktop computer. As non-limiting examples, the controller 320 interaction with the one or more external devices may allow the sporting enthusiast 910 to review and change settings of the invention 100, review status of the invention 100, start and stop operation of the first imaging device 400 and/or the second imaging device 450, watch video recorded by the invention 100, and save video recorded by the invention 100.

The controller 320 may manage the contents of the memory 324 by erasing some portions of the memory 324 when necessary to re-use the memory 324. Specifically, the memory 324 within the controller 320 may provide capacity for recording video of a duration corresponding to a first interval before the memory 324 is full. The controller 320 may subdivide the memory 324 into a plurality of segments representing video recordings of a duration corresponding to a second interval, where the second interval is smaller than the first interval. When the controller 320 senses that the memory 324 is reaching capacity, a segment holding the oldest video recording may be erased and placed into a pool of free memory for immediate reuse. As the memory 324 reaches capacity again, the segment holding the oldest video recording, which is now a different segment of the memory 324, may be erased and placed into the pool of free memory. By managing the memory 324 in this way, the controller 320 may be able to recall video recorded within the timeframe of a maximum review period without running out of the memory 324. The length of the maximum review period is less than or equal to the first interval minus the second interval.

The microprocessor 322 may be a processor that executes instructions to implement the functions and features of the controller 320. The microprocessor 322 may be in electrical communication with the memory 324, the one or more communication circuits 326, the first imaging device 400, and the second imaging device 450.

The memory 324 may comprise one or more electronic circuits that retain information for use by the microprocessor 322. The information retained in the memory 324 may be written to the memory by the microprocessor 322 and may be read from the memory 324 by the microprocessor 322.

The one or more communication circuits 326 may comprise electronic components that enable communication between the controller 320 and the one or more external devices. The one or more communication circuits 326 may be wired or wireless connections. In some embodiments, the one or more communication circuits 326 may comprise a communication port 370 in the form of a hardware connector located on the camera housing 310. As a non-limiting example, the communication port 370 may be a micro USB connector which enables the controller 320 to communicate with the one or more external devices using USB protocols over a USB cable (not illustrated in the figures). In some embodiments, the one or more communication circuits 326 may comprise WiFi interface circuitry which enables the controller 320 to communicate with the one or more external devices using WiFi protocols over a wireless link. In some embodiments, the one or more communication circuits 326 may comprise a wireless serial interconnection circuitry, which enables the controller 320 to communicate with the one or more external devices using the wireless serial interconnection protocols over a wireless link. As a non-limiting example, the wireless serial interconnection protocols may be Bluetooth™ protocols.

The first imaging device 400 may be an electronic device that converts an image to one or more electrical signals. As a non-limiting example, the first imaging device 400 may be a Charge Coupled Device (CCD). The electrical signals representing the image may be read from the first imaging device 400 by the controller 320 and may be stored in the memory 324. A temporal sequence of images may represent a video clip. The at least one camera 300 may provide High Definition images to the controller 320, resulting in HD video being recorded.

The second imaging device 450 may be an electronic device that converts an image to one or more electrical signals. As a non-limiting example, the second imaging device 450 may be a Charge Coupled Device (CCD). The electrical signals representing the image may be read from the second imaging device 450 by the controller 320 and may be stored in the memory 324. A temporal sequence of images may represent a video clip. The at least one camera 300 may provide High Definition images to the controller 320, resulting in HD video being recorded.

The battery 350 may provide electrical energy to operate the controller 320, the first imaging device 400, and the second imaging device 450. The battery 350 may be lithium iron phosphate or another lithium ion technology. The battery 350 may be rechargeable and/or replaceable. As a non-limiting example, the battery 350 may recharge when the controller 320 is connected to the one or more external devices via the communication port 370.

The left shoulder armour 210 may be a rigid, protective shield coupled to the jacket 200 on the top of a left shoulder. The left shoulder armour 210 may be located above the distal left collarbone and may curve down over the left shoulder joint, ending at a level that is lateral to the left shoulder joint. In some embodiments, the left shoulder armour 210 may also at least partially cover the front and rear of the left shoulder joint.

The left shoulder armour 210 may comprise the left camera bracket 240. The left camera bracket 240 may be a mount where the camera housing 310 may detachably couple to the left shoulder armour 210. The left camera bracket 240 may be located on the left shoulder armour 210 above left collerbone. The coupling between the camera housing 310 and the left camera bracket 240 may comprise a slide-mount. As a non-limiting example, a pair of tracks on the left camera bracket 240 may accept the mounting tab 312 on the camera housing 310 as the camera housing 310 is slid into the left camera bracket 240 from the side of the left camera bracket 240 closest to the wearer's neck.

The right shoulder armour 220 may be a rigid, protective shield coupled to the jacket 200 on the top of a right shoulder. The right shoulder armour 220 may be located above the distal right collarbone and may curve down over the right shoulder joint, ending at a level that is lateral to the right shoulder joint. In some embodiments, the right shoulder armour 220 may also at least partially cover the front and rear of the right shoulder joint.

The right shoulder armour 220 may comprise the right camera bracket 245. The right camera bracket 245 may be a mount where the camera housing 310 may detachably couple to the right shoulder armour 220. The right camera bracket 245 may be located on the right shoulder armour 220 above right collerbone. The coupling between the camera housing 310 and the right camera bracket 245 may comprise a slide-mount. As a non-limiting example, a pair of tracks on the right camera bracket 245 may accept the mounting tab 312 on the camera housing 310 as the camera housing 310 is slid into the right camera bracket 245 from the side of the right camera bracket 245 closest to the wearer's neck.

The at least one camera 300 may be worn on either shoulder by sliding the camera housing 310 into the left camera bracket 240 or the right camera bracket 245. The at least one camera 300 may be removed from the left camera bracket 240 or the right camera bracket 245 and taken to another location for use or maintenance. As a non-limiting example, the at least one camera 300 may be removed from the left camera bracket 240 or the right camera bracket 245 and taken to another location to access stored videos or recharge the battery.

The invention 100 may comprise an application program 500 running on the smartphone 950 and communicating with the controller 320 wirelessly. The application program 500 may provide access to functions and features of the controller 320 from the smartphone 950 of the sporting enthusiast 910.

In some embodiments, the invention 100 may comprise a manual on/off control (not illustrated in the figures). The manual on/off control may allow the sporting enthusiast 910 to start and stop recording by pressing one or more buttons accessible on the camera housing 310.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, "Bluetooth" is a standardized communication protocol that is used to wirelessly interconnect electronic devices. Bluetooth® is a registered trademark of Bluetooth SIG.

As used in this disclosure, a "cable" is a collection of insulated wires covered by a protective casing that is used for transmitting electricity or telecommunication signals.

As used in this disclosure, a "camera" is a sensor that converts light into electric signals that encode and records the spatial orientation of the captured light in a manner that reproduces the images seen by a human eye.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used herein, the words "data" and "information" are used interchangeably to refer to raw, unprocessed facts and to facts that have been processed, structured, organized, or present in a context that makes the facts useful.

As used in this disclosure, the terms "distal" and "proximal" may be used to describe relative positions. Distal refers to the object, or the end of an object, that is situated away from the point of origin, point of reference, or point of attachment. Proximal refers to the object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point or a central axis of an object and the direction of comparison may be in a radial or lateral direction.

As used in this disclosure, a "footprint" is the surface area occupied by an object.

As used herein, "front" indicates the side of an object that is closest to a forward direction of travel under normal use of the object or the side or part of an object that normally presents itself to view or that is normally used first. "Rear" or "back' refers to the side that is opposite the front.

As used herein, "high definition" (also abbreviated as "HD") refers to a standard for distribution of video which provides 0.92 MP/frame to 2.07 MP/frame in 720p, 1080i, and 1080p formats, where 'i' formats are interlaced formats and 'p' formats are progressive scan formats.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, a "housing" is a rigid casing that encloses and protects one or more devices.

As used in this disclosure, an "image" is an optical representation or reproduction of an indicia or of the appearance of something or someone.

As used in this disclosure, an "interface" is a physical or virtual boundary that separates two different systems and across which information is exchanged.

As used in this disclosure, a "laptop computer" is a computer that incorporates into a single housing: 1) a mechanism to provide tactile inputs; 2) a mechanism to provide visual and audio outputs; 3) a mechanism to receive digital or analog inputs from an external mechanical device; and, 4) a mechanism to provide digital or analog outputs to an external mechanical device. The single housing is sized such that the laptop computer can be transported by a single person.

As used in this disclosure, the word "lateral" refers to the sides of an object or movement towards a side. Lateral directions are generally perpendicular to longitudinal directions. "Laterally" refers to movement in a lateral direction.

As used in this disclosure, a "port" is an electrical termination that is used to connect a first electrical circuit to a second external electrical circuit.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used herein, a "tablet computer" or "tablet" refers to a mobile computing device packaged as a single, monolithic unit—similar in appearance to a paper tablet. Typically, tablet computers have a touch sensitive, flat video display covering most of the front surface and do not have a keyboard; although many tablet computers may be mated with a separate keyboard accessory. Tablet computers generally comprise one or more microprocessors, memory, and a rechargeable battery internal to the tablet. Most tablet computers comprise a wireless network connection, typically via a WiFi interface. Many tablet computers comprise an internal camera, microphone, and one or more audio speakers. Interaction between the user and a tablet computer is generally via the touch screen using a stylus or fingers and may involve the use of 'gestures' which are specific motions on the touch screen which are interpreted by the tablet computer to magnify or shrink the display, open, close, or switch between applications, scroll, or perform other tablet computer functions.

As used in this disclosure, "USB" is an acronym for Universal Serial Bus, which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

As used in this disclosure, "vertical" refers to a direction that is parallel to the local force of gravity. Unless specifically noted in this disclosure, the vertical direction is always perpendicular to horizontal.

As used in this disclosure, "WiFi" refers to the physical implementation of a collection of wireless electronic communication standards commonly referred to as IEEE 802.11x and used for wireless communication between devices.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A jacket camera comprising:
    a jacket, at least one camera, a left shoulder armour, and a right shoulder armour;
    wherein the jacket camera provides a forward-looking camera and a rear-looking camera mounted on the left shoulder armour, on the right shoulder armour, or on both;
    wherein the jacket is a hip-length, contour-fitting jacket worn by a sporting enthusiast to provide protection from the weather and from injuries;
    wherein the at least one camera comprises a camera housing, a controller, a first imaging device, a second imaging device, and a battery;
    wherein the at least one camera is mounted onto a left camera bracket or onto a right camera bracket;
    wherein the at least one camera records video using the first imaging device and the second imaging device at the same time;
    wherein if the at least one camera is mounted onto the left camera bracket then the first imaging device acts as the forward-looking camera, recording video in front of the sporting enthusiast, and the second imaging device acts as the rear-looking camera, recording video behind the sporting enthusiast;

wherein if the at least one camera is mounted onto the right camera bracket then the first imaging device acts as the rear-looking camera, recording video behind the sporting enthusiast, and the second imaging device acts as the forward-looking camera, recording video in front of the sporting enthusiast.

2. The jacket camera according to claim 1
wherein the camera housing is an enclosure for the first imaging device, the second imaging device, the controller, and the battery;
wherein the camera housing comprises a mounting tab on the bottom side of the camera housing for attachment to the left camera bracket or to the right camera bracket;
wherein the camera housing has a rectangular footprint when viewed from above;
wherein the top of the camera housing is flat except for a hump extending vertically upwards where the first imaging device and the second imaging device are located;
wherein the hump is oriented to provide an unobstructed view in forward and rearward directions for the first imaging device and the second imaging device which are mounted inside of the camera housing on flat side walls of the hump.

3. The jacket camera according to claim 2
wherein the camera housing provides a first pivoting mount and/or a second pivoting mount to allow pivoting in one or more directions of the first imaging device and/or the second imaging device, respectively;
wherein the first pivoting mount and the second pivoting mount allow the viewing angle of the first imaging device and the second imaging device to be altered in a vertical plane, a horizontal plane, or both.

4. The jacket camera according to claim 2
wherein the controller comprises a microprocessor, memory, and one or more communication circuits;
wherein the controller is electrically coupled to the first imaging device and to the second imaging device;
wherein the controller captures video from the first imaging device and the second imaging device and store the video in the memory;
wherein the controller communicates with one or more external devices.

5. The jacket camera according to claim 4
wherein the controller manages the contents of the memory by erasing some portions of the memory when necessary to re-use the memory;
wherein the memory within the controller provides capacity for recording video of a duration corresponding to a first interval before the memory is full;
wherein the controller subdivides the memory into a plurality of segments representing video recordings of a duration corresponding to a second interval, where the second interval is smaller than the first interval;
wherein when the controller senses that the memory is reaching capacity, a segment holding the oldest video recording is erased and placed into a pool of free memory for immediate reuse;
wherein as the memory reaches capacity again, the segment holding the oldest video recording, which is now a different segment of the memory, is erased and placed into the pool of free memory;

wherein the controller is able to recall video recorded within the timeframe of a maximum review period without running out of the memory;
wherein the length of the maximum review period is less than or equal to the first interval minus the second interval.

6. The jacket camera according to claim 5
wherein the microprocessor is a processor that executes instructions to implement the functions and features of the controller;
wherein the microprocessor is in electrical communication with the memory, the one or more communication circuits, the first imaging device, and the second imaging device;
wherein the memory comprises one or more electronic circuits that retain information for use by the microprocessor;
wherein the information retained in the memory is written to the memory by the microprocessor and is read from the memory by the microprocessor.

7. The jacket camera according to claim 6
wherein the one or more communication circuits comprise electronic components that enable communication between the controller and the one or more external devices;
wherein the one or more communication circuits comprise wired or wireless connections.

8. The jacket camera according to claim 7
wherein the one or more communication circuits comprises a communication port in the form of a hardware connector located on the camera housing.

9. The jacket camera according to claim 8
wherein the communication port is a micro USB connector which enables the controller to communicate with the one or more external devices using USB protocols over a USB cable.

10. The jacket camera according to claim 8
wherein the one or more communication circuits comprise a wireless serial interconnection circuitry which enables the controller to communicate with the one or more external devices using the wireless serial interconnection protocols over a wireless link.

11. The jacket camera according to claim 10
wherein the first imaging device is an electronic device that converts an image to one or more electrical signals;
wherein the second imaging device is an electronic device that converts an image to one or more electrical signals;
wherein the one or more electrical signals representing an image are read from the first imaging device and the second imaging device by the controller and are stored in the memory;
wherein a temporal sequence of the images represent a video clip.

12. The jacket camera according to claim 11
wherein the first imaging device is a Charge Coupled Device;
wherein the second imaging device is a Charge Coupled Device.

13. The jacket camera according to claim 11
wherein the battery provides electrical energy to operate the controller, the first imaging device, and the second imaging device;
wherein the battery is rechargeable and/or replaceable.

14. The jacket camera according to claim 13
wherein the left shoulder armour is a rigid, protective shield coupled to the jacket on the top of a left shoulder;

wherein the left shoulder armour is located above the distal left collarbone and curves down over the left shoulder joint, ending at a level that is lateral to the left shoulder joint;

wherein the left shoulder armour comprises the left camera bracket;

wherein the left camera bracket is a mount where the camera housing detachably couples to the left shoulder armour;

wherein the left camera bracket is located on the left shoulder armour above left collerbone;

wherein the coupling between the camera housing and the left camera bracket comprises a slide-mount;

wherein a pair of tracks on the left camera bracket accepts the mounting tab on the camera housing as the camera housing is slid into the left camera bracket from the side of the left camera bracket closest to the wearer's neck.

15. The jacket camera according to claim 14 wherein the right shoulder armour is a rigid, protective shield coupled to the jacket on the top of a right shoulder;

wherein the right shoulder armour is located above the distal right collarbone and curves down over the right shoulder joint, ending at a level that is lateral to the right shoulder joint;

wherein the right shoulder armour comprises the right camera bracket;

wherein the right camera bracket is a mount where the camera housing detachably couples to the right shoulder armour;

wherein the right camera bracket is located on the right shoulder armour above right collerbone;

wherein the coupling between the camera housing and the right camera bracket comprises a slide-mount;

wherein a pair of tracks on the right camera bracket accepts the mounting tab on the camera housing as the camera housing is slid into the right camera bracket from the side of the right camera bracket closest to the wearer's neck.

16. The jacket camera according to claim 15 wherein the jacket camera comprises an application program running on a smartphone and communicating with the controller wirelessly;

wherein the application program provides access to functions and features of the controller from the smartphone of the sporting enthusiast.

17. The jacket camera according to claim 16 wherein the jacket camera comprises a manual on/off control;

wherein the manual on/off control allows the sporting enthusiast to start and stop recording by pressing one or more buttons accessible on the camera housing.

* * * * *